US011891938B2

(12) United States Patent
Adi et al.

(10) Patent No.: US 11,891,938 B2
(45) Date of Patent: Feb. 6, 2024

(54) SYSTEMS AND METHODS FOR OPTIMIZING ENGINE-AFTERTREATMENT SYSTEM OPERATION

(71) Applicant: Cummins Inc., Columbus, IN (US)

(72) Inventors: Gayatri Adi, Columbus, IN (US); Kartavya Neema, Columbus, IN (US); Paul V. Moonjelly, Columbus, IN (US); Karla Carale Stricker Fuhs, Columbus, IN (US); Chinmay Rao, Columbus, IN (US)

(73) Assignee: Cummins Inc., Columbus, IN (US)

(*) Notice: Subject to any disclaimer, the term of this patent is extended or adjusted under 35 U.S.C. 154(b) by 0 days.

(21) Appl. No.: 17/862,031

(22) Filed: Jul. 11, 2022

(65) Prior Publication Data

US 2022/0364492 A1 Nov. 17, 2022

Related U.S. Application Data

(63) Continuation of application No. 16/492,236, filed as application No. PCT/US2018/020640 on Mar. 2, 2018, now Pat. No. 11,401,854.

(Continued)

(51) Int. Cl.

*F01N 9/00* (2006.01)
*F02D 41/00* (2006.01)

(Continued)

(52) U.S. Cl.

CPC ............... *F01N 9/00* (2013.01); *F01N 9/005* (2013.01); *F02D 41/0047* (2013.01);

(Continued)

(58) Field of Classification Search

CPC ........ F01N 9/00; F01N 9/005; F01N 2900/08; F01N 2900/14; F01N 2900/1402;

(Continued)

(56) References Cited

U.S. PATENT DOCUMENTS

| | | | |
|---|---|---|---|
| 6,775,623 | B2 | 8/2004 | Ali et al. |
| 7,779,680 | B2 | 8/2010 | Sasaki et al. |

(Continued)

FOREIGN PATENT DOCUMENTS

| | | | |
|---|---|---|---|
| CN | 101578558 | A | 11/2009 |
| CN | 108779729 | A | 11/2018 |

(Continued)

OTHER PUBLICATIONS

International Search Report and Written Opinion for International Application No. PCT/US2018/020640, dated May 15, 2018, 10 pages.

(Continued)

*Primary Examiner* — Phutthiwat Wongwian
*Assistant Examiner* — Susan E Scharpf
(74) *Attorney, Agent, or Firm* — Foley & Lardner LLP

(57) ABSTRACT

Systems and methods for controlling a performance variable of an engine system are provided. An apparatus includes a response model circuit structured to apply a constraint to a response model that represents a relationship regarding a manipulated variable or a relationship between the performance variable and the manipulated variable. The apparatus further includes an optimization circuit structured to determine a target for the manipulated variable via the response model such that the target of the manipulated variable satisfies the constraint of the response model. The performance variable is indicative of performance of operation of the engine system and the manipulated variable is capable of affecting the performance variable. Operation of the engine system is adjusted based upon the target of the manipulated variable by controlling at least one of a fuel system or an air handling system of the engine system.

20 Claims, 5 Drawing Sheets

Related U.S. Application Data

(60) Provisional application No. 62/469,901, filed on Mar. 10, 2017.

(51) Int. Cl.
*F02D 41/02* (2006.01)
*F02D 43/04* (2006.01)

(52) U.S. Cl.
CPC ......... *F02D 41/0235* (2013.01); *F02D 43/04* (2013.01); *F01N 2900/08* (2013.01); *F01N 2900/14* (2013.01); *F01N 2900/1402* (2013.01); *F01N 2900/16* (2013.01); *F01N 2900/1614* (2013.01); *F01N 2900/1622* (2013.01); *F01N 2900/1806* (2013.01)

(58) Field of Classification Search
CPC ......... F01N 2900/16; F01N 2900/1614; F01N 2900/1622; F01N 2900/1806; F01N 2900/12; F01N 3/18; F02D 41/0047; F02D 41/0235; F02D 43/04
See application file for complete search history.

(56) References Cited

U.S. PATENT DOCUMENTS

| | | | | |
|---|---|---|---|---|
| 7,831,378 | B2 | 11/2010 | Wills | |
| 8,453,431 | B2 | 6/2013 | Wang et al. | |
| 8,656,702 | B2 | 2/2014 | Alm et al. | |
| 2002/0195086 | A1 | 12/2002 | Beck et al. | |
| 2004/0073381 | A1* | 4/2004 | Ali | G01N 33/0037 702/31 |
| 2005/0072406 | A1* | 4/2005 | Cullen | F02P 5/1521 123/494 |
| 2005/0072496 | A1 | 4/2005 | Hwang et al. | |
| 2006/0137346 | A1* | 6/2006 | Stewart | F02D 41/1401 60/605.2 |
| 2006/0212140 | A1 | 9/2006 | Brackney | |
| 2007/0255484 | A1 | 11/2007 | Imai et al. | |
| 2008/0066454 | A1* | 3/2008 | Viola | F01N 3/208 60/301 |
| 2008/0109146 | A1* | 5/2008 | Wang | F02D 41/028 60/285 |
| 2010/0083636 | A1* | 4/2010 | Wang | F01N 3/2066 60/277 |
| 2010/0107606 | A1 | 5/2010 | Narayanaswamy et al. | |
| 2011/0087420 | A1 | 4/2011 | Stewart et al. | |
| 2011/0264353 | A1* | 10/2011 | Atkinson | F02D 41/1402 706/14 |
| 2012/0283848 | A1* | 11/2012 | Johannaber | G05B 13/042 700/28 |
| 2013/0111878 | A1 | 5/2013 | Pachner et al. | |
| 2015/0308321 | A1* | 10/2015 | Zhang | F01N 3/208 701/101 |
| 2016/0025020 | A1* | 1/2016 | Hodzen | F02D 41/0065 701/103 |
| 2018/0149099 | A1* | 5/2018 | Kothandaraman | F02D 41/0077 |

FOREIGN PATENT DOCUMENTS

| | | | |
|---|---|---|---|
| JP | 2016-160855 | A | 9/2016 |
| WO | WO-2016/130517 | A1 | 8/2016 |
| WO | WO 2017/065756 | A1 | 4/2017 |

OTHER PUBLICATIONS

Zhang et al. "Linearly constrained global optimization via piecewise-linear approximation." In: Journal of Computational and Applied Mathematics 214 (2008) 111-120; from International Search Report dated Sep. 9, 2019 (Year: 2008).
Zhang et al., "Linearly Constrained Global Optimization via Piecewise-Linear Approximation", Journal of Computational and Applied Mathematics 214, 2008, pp. 111-120.
Chinese Office Action on CN App. No. 2022101378553 dated May 4, 2023, English translation.
2nd Office Action, dated Nov. 20, 2023, issued in corresponding Chinese Patent Application No. 2022101378553.

* cited by examiner

SYSTEMS AND METHODS FOR OPTIMIZING ENGINE-AFTERTREATMENT SYSTEM OPERATION

CROSS-REFERENCE TO RELATED APPLICATIONS

This application is a continuation of U.S. application Ser. No. 16/492,236, filed Sep. 9, 2019, which is a U.S. national stage filing of PCT Application No. PCT/US2018/020640, filed Mar. 2, 2018, which claims the benefit of and priority to U.S. Provisional Application No. 62/469,901, filed Mar. 10, 2017, all of which are incorporated herein by reference in their entireties.

TECHNICAL FIELD

The present disclosure relates generally to real time optimization of the operation of engine-aftertreatment system.

BACKGROUND

For varying operating environments, an engine and aftertreatment system needs to comply with stringent emissions regulations under real world duty cycles. Meanwhile, minimal fuel and/or reductant fluid consumption and good drivability are desired. Complex dynamic optimization techniques have been applied to solve the multi-dimensional non-linear problems, such as minimizing fluid consumption under engine out nitrogen oxide (EONOx), exhaust temperature and other constraints imposed by the aftertreatment system. For example, a sequence of decisions are made at each execution step in order to optimize an objective function dynamically. There technique can be fairly computationally expensive. It is desirable to have a simplified approach to optimize the operation of engine and aftertreatment system on a real time basis.

SUMMARY

An embodiment relates to an apparatus for optimizing a performance variable for an engine system. The apparatus comprises a response model circuit structured to apply constraints including constraints of manipulated variables to response models. The response models each represent a piecewise linear relationship between the manipulated variables or a piecewise linear relationship between the performance variable and the manipulated variables. The apparatus also comprises a quasi-simplex optimization circuit structured to determine an optimal target for each of the manipulated variables by using a quasi-simplex optimization process on the response models. The optimal targets of the manipulated variables correspond to an optimal value of the performance variable.

Another embodiment relates to method for optimizing a performance variable for an engine system. The method comprises applying constraints including constraints of manipulated variables to response models. The response models each represent a piecewise linear relationship between the manipulated variables or a piecewise linear relationship between the performance variable and the manipulated variables. The method also comprises determining an optimal target for each of the manipulated variables by using a quasi-simplex optimization process on the response models. The optimal targets of the manipulated variables correspond to an optimal value of the performance variable.

Yet another embodiment relates to a system for optimizing a performance variable for an engine system comprising a processing circuit. The processing circuit is structured to apply constraints including constraints of manipulated variables to response models. The response models each represent a piecewise linear relationship between the manipulated variables or a piecewise linear relationship between the performance variable and the manipulated variables. The processing circuit is also structured to determine an optimal target for each of the manipulated variables by using a quasi-simplex optimization process on the response models. The optimal targets of the manipulated variables correspond to an optimal value of the performance variable.

These and other features, together with the organization and manner of operation thereof, will become apparent from the following detailed description when taken in conjunction with the accompanying drawings.

DETAILED DESCRIPTION

Figure 1:
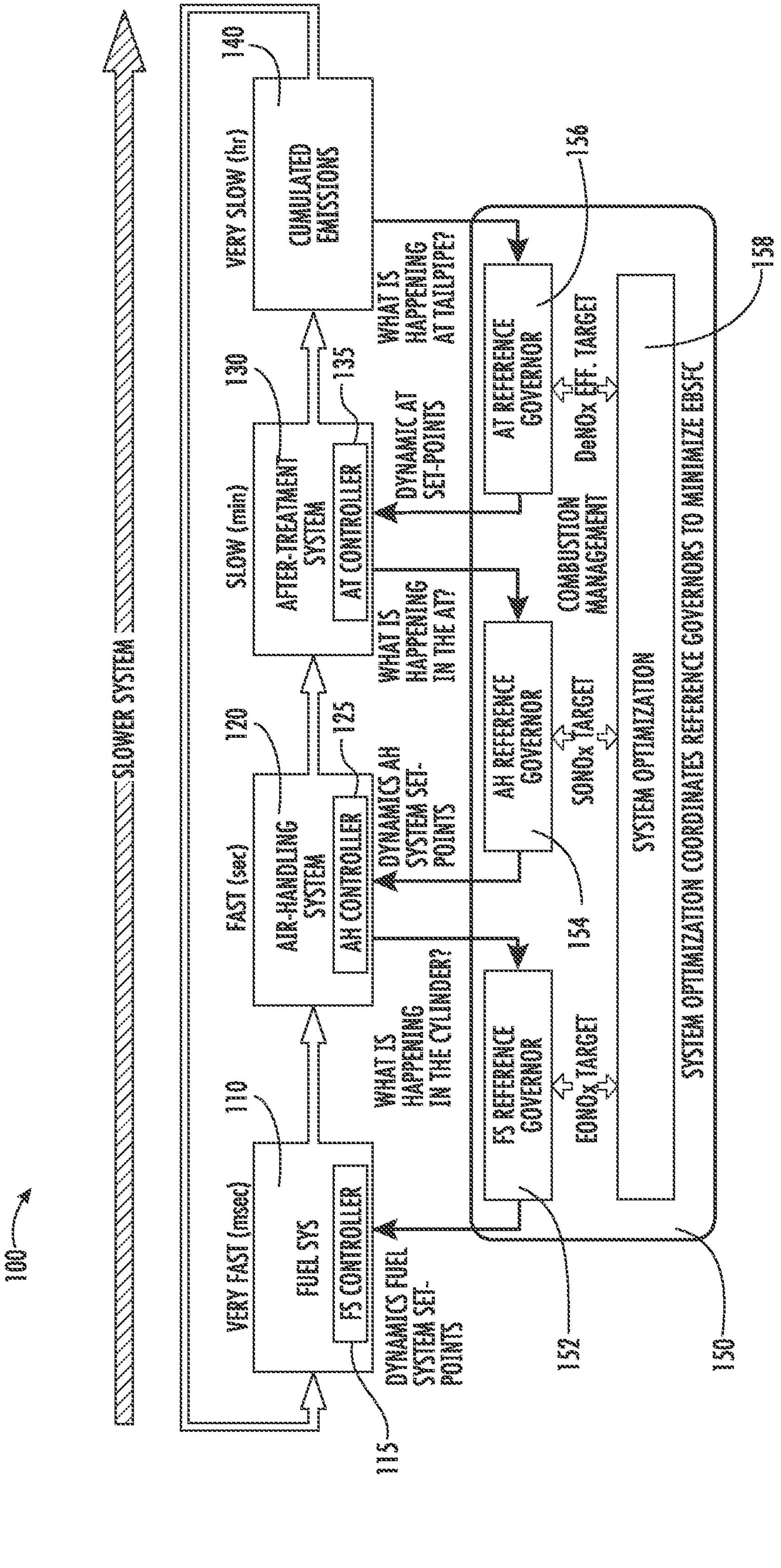
FIG. 1 is a schematic diagram of an engine system from a control point of view, according to an example embodiment.

For the purposes of promoting an understanding of the principles of the disclosure, reference will now be made to the embodiments illustrated in the drawings and specific language will be used to describe the same. It will nevertheless be understood that no limitation of the scope of the disclosure is thereby intended, any alterations and further modifications in the illustrated embodiments, and any further applications of the principles of the disclosure as illustrated therein as would normally occur to one skilled in the art to which the disclosure relates are contemplated herein.

Referring to the Figures generally, various embodiments disclosed herein relate to systems, methods, and apparatuses for optimizing a performance variable for an engine system. The performance variable can be, for example, the reductant fluid consumption by an aftertreatment system, the fuel consumption, etc., that indicate the performance of the engine system. At the same time, the engine and aftertreatment system need to comply with emissions regulations under real world duty cycles. According to the disclosure herein, the performance variable can be optimized on a real time basis with aftertreatment constraints being met. In particular, response models between manipulated variables are created along with response models for other performance variables such as reductant fluid and/or fuel consumption, and other engine responses such as smoke, hydrocarbon emissions, exhaust temperature etc. The manipulated variables can be, for example, the engine out nitrogen oxide (EONOx), in-cylinder oxygen, etc., that can affect the performance variable. Each response model is a piecewise linear model. Constraints on the manipulated variables are applied to the response models. For example, the aftertreatment system may impose a minimal allowable EONOx constraint and a maximum allowable EONOx constraint based on its current state. An air handling system may impose a minimal achievable in-cylinder oxygen constraint and a maximum achievable in-cylinder constraint based on its current state.

A quasi-simplex optimization process is performed to determine an optimal target for each of the manipulated variables based on the constrained response models. The optimal targets of the manipulated variables correspond to an optimal value of the performance variable. In particular, a local optimal value of the performance variable is determined for each constrained response model. A global optimal value is chosen from the local optimal values, which can be, for example, the minimum of the local optimal values. The optimal targets for the manipulated variables can be used to generate references for the operation of the engine system. For example, the optimal target for EONOx can be used to generate a reference for the fuel system, and the optimal target for in-cylinder oxygen can be used to generate a reference for the air handling system of the engine system.

In some embodiments, the response models can be modified with an ambient humidity in order to improve accuracy of the real time static optimization. In particular, EONOx monitored by an EONOx sensor or an estimator is used as a feedback to estimate the ambient humidity, which in turn is used to calculate the humidity compensation. Although this implementation does not necessitate the use of a humidity sensor, a humidity sensor may be used in conjunction to validate the estimation.

The disclosure herein describes a simplified optimization approach by creating piecewise linear response models of the engine system, which enables static optimization at a single point of time. The quasi-simplex approach uses a modified form of the classic simplex technique which reduces computational burden, thus making it amenable for real time control by an embedded microprocessor.

Referring now to FIG. 1, a schematic diagram of an engine system 100 is shown from a control point to view, according to an example embodiment. The engine system 100 can be used in either mobile applications such as with a vehicle or stationary applications such as a power generation system. The engine system 100 may include any internal combustion engine (e.g., compression-ignition, spark-ignition) powered by any fuel type (e.g., diesel, ethanol, gasoline, etc.). The engine system 100 may include a four-stroke (i.e., intake, compression, power, and exhaust) engine.

From a control point, the engine system 100 can be divided into subsystems including a fuel system 110, an air handling system 120, an aftertreatment system 130, and an engine controller 150. Cumulated emissions 140 (e.g., NOx emission) from a tailpipe of the engine system 100 during a period of time (e.g., duty cycles) needs to be kept below a level provided by emissions regulations. The fuel system 110, air handling system 120, and aftertreatment system 130 operate on different time scales (i.e., have different time constants). The time constant of the fuel system 110 is in the order of milliseconds. The time constant of the air handling system 120 is in the order of seconds. The time constant of the aftertreatment system 130 is in the order of minutes, while cumulated emissions have a much longer time scale of several minutes. This time-scale separation allows the subsystems to be controlled separately because a slower subsystem can be assumed to be static by a faster subsystem. The engine controller 150 is in communication with the fuel system 110, air handling system 120, and aftertreatment system 130 and configured to optimize a performance variable of the engine system 100 (e.g., reductant fluid consumption, fuel consumption, etc.) on a real time basis.

The fuel system 110 may include a fuel pump, one or more fuel lines (or a common rail system), and one or more fuel injectors that supply fuel or one or more cylinders from a fuel source (e.g., fuel tank). For example, fuel may be suctioned from the fuel source by the fuel pump and fed to the common rail system, which distributes fuel to the fuel injectors for each cylinder. Fuel can be pressurized to boot and control the pressure of the fuel delivered to the cylinders. The fuel system 110 includes a fuel system controller 115 configured to control the injection pressure, injection timing, quantity of respective injections, and so on. In some embodiments, the fuel system controller 115 may use a difference between the actual engine torque and a reference engine torque to determine the fuel injection quantity. The fuel injection has an instantaneous influence (e.g., in the order of milliseconds) on the combustion and the resulting torque and pollutant emissions.

The air handling system 120 may include a turbo charger and optionally an exhaust gas recirculation (EGR). The turbo charger may include a compressor, a turbine, and a shaft mechanically coupling the compressor to the turbine. The compressor may compress the fresh-air charge of the engine system 100, thus increasing the temperature and pressure of the air flow. Burnt products of the combustion process (i.e., exhaust gas) may be expelled into the turbine and drive the turbine to rotate, which in turn drives the compressor to compress the air supplied to the engine system 100. The turbo chargers may be controlled by a bypass valve (e.g., waste gate) or a variable geometry turbine (VGT). The bypass valve or VGT enables part of the exhaust gas to bypass the turbine. Therefore, less exhaust gas energy is available to the turbine, less power is transferred to the compressor, and the air flow is supplied to the engine system 100 at a lower rate. The position of the bypass valve or VGT may be adjusted in order to alter the charge flow rate.

The EGR may take the exhaust gas from an exhaust manifold and feed it to an intake manifold, where the exhaust gas is mixed with the fresh air supplied by the turbo charger. The EGR can decrease the oxygen concentration of the aspirated gas mixture. Meanwhile, the thermal mass of the cylinder content may be increased and thus the combustion temperature may be reduced. Since high combustion temperature and high oxygen concentration may result in high production of NOx, the use of EGR may decrease the NOx emission. The EGR may be controlled by a valve and/or a throttle, which can be adjusted in order to alter the flow rate of the exhaust gas mixed with the fresh air.

The air handling system 120 includes an air handling controller 125 configured to control the bypass valve (or VGT) for the turbo charger and the valve (and/or throttle) for the EGR in order to supply the desired aspirated gas mixture to the cylinder for the combustion. The fuel consumption and NOx emissions depend on the cylinder content, for example, the in-cylinder oxygen concentration. The response time of the air handling system 120 to a reference (i.e., a setpoint) in-cylinder oxygen concentration is in the order of seconds, in some embodiments.

The aftertreatment system 130 may include catalytic device(s) and particulate filter(s) configured to transform/reduce the environmentally harmful emissions (e.g., NOx, CO, soot, etc.) from the engine system 100. For various applications, the catalytic device(s) may include at least one of a diesel oxidation catalyst (DOC) device, ammonia oxidation (AMOX) catalyst device, selective catalytic reduction (SCR) device, three-way catalyst (TWC), lean NOX trap (LNT), etc. The particulate filter(s) may include diesel particulate filter (DPF), partial flow particulate filter (PFF), etc. In the aftertreatment system 130 that includes the particulate filter(s), active particulate filter regeneration can serve in part as a regeneration event for the catalytic device(s) and particulate filter(s) to remove urea deposits and to desorb hydrocarbons.

In some embodiments, a reductant delivery device is disposed upstream of an SCR device in the aftertreatment system 130. The SCR device may include a reduction catalyst that facilitates conversion of NOx to $N_2$ by a reductant. The reductant includes, for example, hydrocarbon, ammonia, urea, diesel exhaust fluid (DEF), or any suitable reductant. The reductant may be injected into the exhaust flow path by the reductant delivery device in liquid and/or gaseous form, such as aqueous solutions of urea, ammonia, anhydrous ammonia, or other reductants suitable for SCR operations. The aftertreatment system 130 includes an aftertreatment system controller 135 configured to control the quantity of reductant injection in order to control the tailpipe NOx emissions (also known as system out NOx (SONOx)). The response time of the aftertreatment system 130 to a reference (i.e., a setpoint) SONOx is in the order of minutes.

The engine controller 150 includes a fuel system reference governor 152, an air handling reference governor 154, an aftertreatment reference governor 156, and a system optimization processor (also called an optimizer) 158. In operation, the fuel system reference governor 152, air handling reference governor 154, and aftertreatment reference governor 156 can receive various data indicative of the operation state and constraints from corresponding subsystems, i.e., the fuel system 110, air handling system 120, aftertreatment system 130, and tailpipe. The engine data may include, for example, engine speed, engine torque, temperatures at various subsystems, species concentration at various subsystems, etc. The constraint data may include, for example, mechanical limits, minimum and maximum allowable EONOx by the aftertreatment system 130, etc.

Based on the data received, the optimizer 158 may determine various operation parameters to optimize the performance variable (e.g., fluid/fuel consumption) and at the same time meet the emission regulations, aftertreatment emissions constraints and other constraints. For example, the optimizer 158 may determine an optimal target for EONOx and an optimal target for in-cylinder oxygen. The fuel system reference governor 152, air handling reference governor 154, and aftertreatment reference governor 156 can transmit the optimal targets to corresponding subsystems. The fuel system 110, air handling system 120, and aftertreatment system 130 may use the optimal targets to generate corresponding references (i.e., setpoints) for their operation. The fuel system 110, for example, can generate optimized fuel system references based on the EONOx reference, in order to compensate for the actual oxygen state as well as the actual NOx state.

Figure 2:
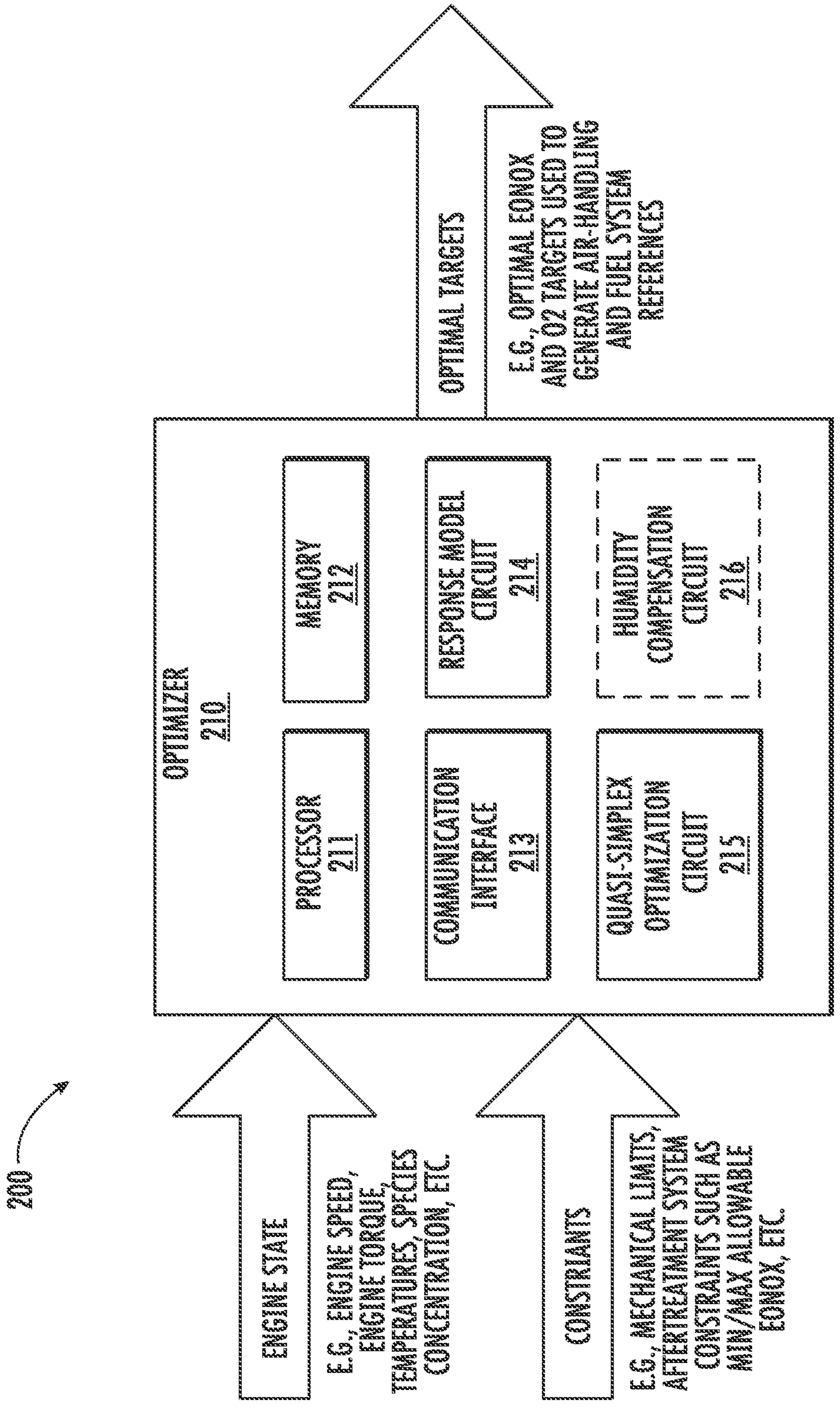
FIG. 2 is a schematic block diagram of a system for optimizing a performance variable for an engine system, according to an example embodiment.

Referring now to FIG. 2, a schematic block diagram of system 200 for optimizing the operation of the engine system 100 of FIG. 1 is shown, according to an example embodiment. The system 200 includes an optimizer 200, which may be used as the system optimization processor 158 of FIG. 1, or a combination of the system optimizer processor 158 with any or all of the fuel system reference governor 152, the air handling reference governor 154, and the aftertreatment reference governor 156. The optimizer 210 is shown to include a processor 211, memory 212, communication interface 213, response model circuit 214, quasi-simplex optimization circuit 215, and optionally, a humidity compensation circuit 216.

The processor 211 may be implemented as any type of processor including an embedded microprocessor, an application specific integrated circuit (ASIC), one or more field programmable gate arrays (FPGAs), a digital signal processor (DSP), a group of processing components, or other suitable electronic processing components. The one or more memory devices 212 (e.g., NVRAM, RAM, ROM, Flash Memory, hard disk storage, etc.) may store data and/or computer code for facilitating the various processes described herein. Thus, the one or more memory devices 212 may be communicably connected to the processor 211 and provide computer code or instructions for executing the processes described in regard to the optimizer 210 herein. Moreover, the one or more memory devices 212 may be or include tangible, non-transient volatile memory or non-volatile memory. Accordingly, the one or more memory devices 212 may include database components, object code components, script components, or any other type of information structure for supporting the various activities and information structures described herein.

The communication interface 213 enables communication between the optimizer 210 and subsystems (e.g., fuel system, air-handling system, aftertreatment system, tailpipe) of an engine system. The subsystems can monitor various operating parameters of the engine (e.g., the engine 100 of FIG. 1), for example, the engine speed, the engine torque, temperatures of various components (e.g., cylinder, aftertreatment system, tailpipe, etc.), species concentration at various components (e.g., in-cylinder oxygen, EONOx, SONOx, etc.), and so on. The subsystems can generate data indicative of various constraints of the subsystems, for example, mechanical limits (e.g., valve positions), minimum/maximum allowable EONOx at the aftertreatment system, and so on. The optimizer 210 can receive the engine state and constraints from the subsystems, process the data to generate optimal targets for manipulated variables to optimize the engine performance variable, and send the optimal targets to the subsystems. The optimal targets may include, for example, optimal EONOx and in-cylinder oxygen used to generate air-handling and fuel system references. The subsystem can adjust the operation according to the optimal targets from the optimizer 210. Communication between and among the optimizer 210 and the subsystems may be via any number of wired or wireless connections. For example, a wired connection may include a serial cable, a fiber optic cable, a CATS cable, or any other form of wired connection. In comparison, a wireless connection may include the Internet, Wi-Fi, cellular, radio, etc. In some embodiments, a CAN bus provides the exchange of signals, information, and/or data. The CAN bus includes any number of wired and wireless connections.

As shown, the optimizer 210 includes various circuits for completing the activities described herein. In one embodiment, the circuits of the optimizer 210 may utilize the processor 211 and/or memory 212 to accomplish, perform, or otherwise implement various actions described herein with respect to each particular circuit. In this embodiment, the processor 211 and/or memory 212 may be considered to be shared components across each circuit. In another embodiment, the circuits (or at least one of the circuits) may include their own dedicated processing circuit having a processor and a memory device. In this latter embodiment, the circuit may be structured as an integrated circuit or an otherwise integrated processing component. In yet another embodiment, the activities and functionalities of circuits may be embodied in the memory 212, or combined in multiple circuits, or as a single circuit. In this regard and while various circuits with particular functionality are shown in FIG. 2, it shall be understood that the optimizer 210 may include any number of circuits for completing the functions and activities described herein. For example, the activities of multiple circuits may be combined as a single circuit, as an additional circuit(s) with additional functionality, etc.

Certain operations of the optimizer 210 described herein include operations to interpret and/or to determine one or more parameters. Interpreting or determining, as utilized herein, includes receiving values by any method known in the art, including at least receiving values from a datalink or network communication, receiving an electronic signal (e.g. a voltage, frequency, current, or PWM signal) indicative of the value, receiving a computer generated parameter indicative of the value, reading the value from a memory location on a non-transient computer readable storage medium, receiving the value as a run-time parameter by any means known in the art, and/or by receiving a value by which the interpreted parameter can be calculated, and/or by referencing a default value that is interpreted to be the parameter value.

As shown, the optimizer 210 includes a response model circuit 214, a quasi-simplex optimization circuit 215, and optionally, a humidity compensation circuit 216. Through the circuits 214-216, the optimizer 210 is structured to apply constraints of manipulated variables to response models, determine optimal targets for the manipulated variables based on the restrained response models using quasi-simplex optimization, and optionally, compensate the response models with an ambient humidity.

Figure 3A:
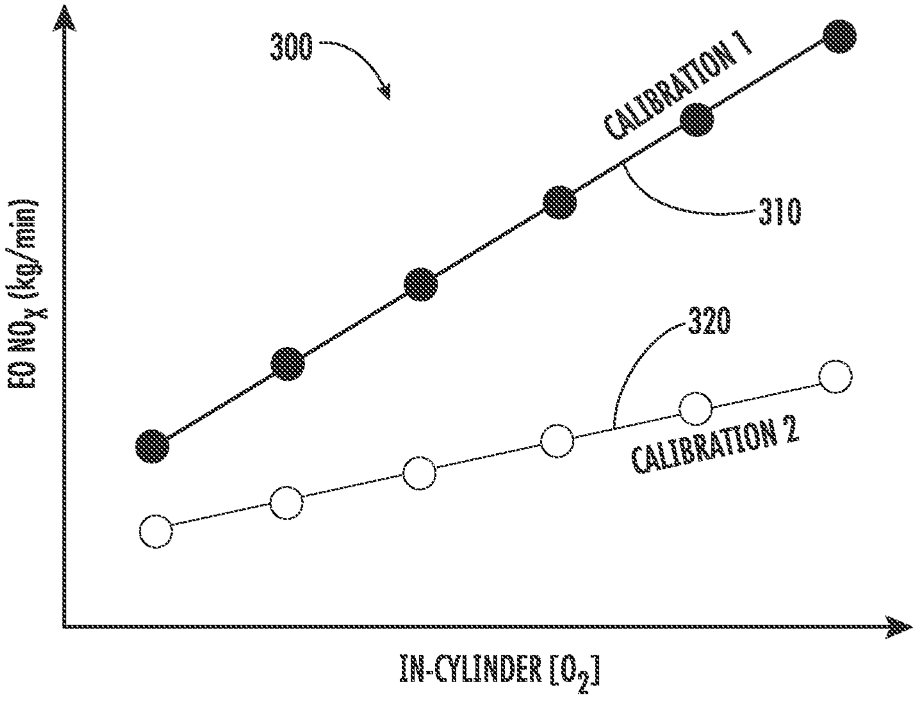
FIG. 3A is a graph showing a response model for engine out nitrogen oxide (EONOx) and in-cylinder oxygen, according to an example embodiment.

The response model circuit 214 is structured to apply constraints including constraints of manipulated variables (e.g., EONOx, in-cylinder oxygen) on response models. In some embodiments, piecewise linear response models are created to describe the dynamics of the complex engine system (e.g., the engine system 100 of FIG. 1). Referring to FIG. 3A, a graph shows a response model of EONOx as a function of in-cylinder oxygen at a fixed speed, load. There may be multiple response models for EONOx and in-cylinder oxygen, each of which is a straight-line section (i.e., piecewise linear). Line 310 represents the EONOx varying with the in-cylinder oxygen under a first calibration. Line 320 represents the EONOx varying with the in-cylinder oxygen under a second calibration. The first and second calibrations may be obtained under different cost functions (e.g., optimize for fueling, optimize for particular emissions, etc.). There may be other calibrations represented by lines between lines 310 and 320. For a particular in-cylinder oxygen, EONOx produced in a combustion under the first calibration is more than EONOx produced in a combustion under the second calibration. It should be understood that the EONOx is described and illustrated as an example and not for limitation. Similarly response models can be established for other combustion output parameters, such as exhaust temperatures, fuel consumption etc., which can be expressed as a piecewise liner function of in-cylinder oxygen. The response models may be stored in the memory 212.

Figure 3B:
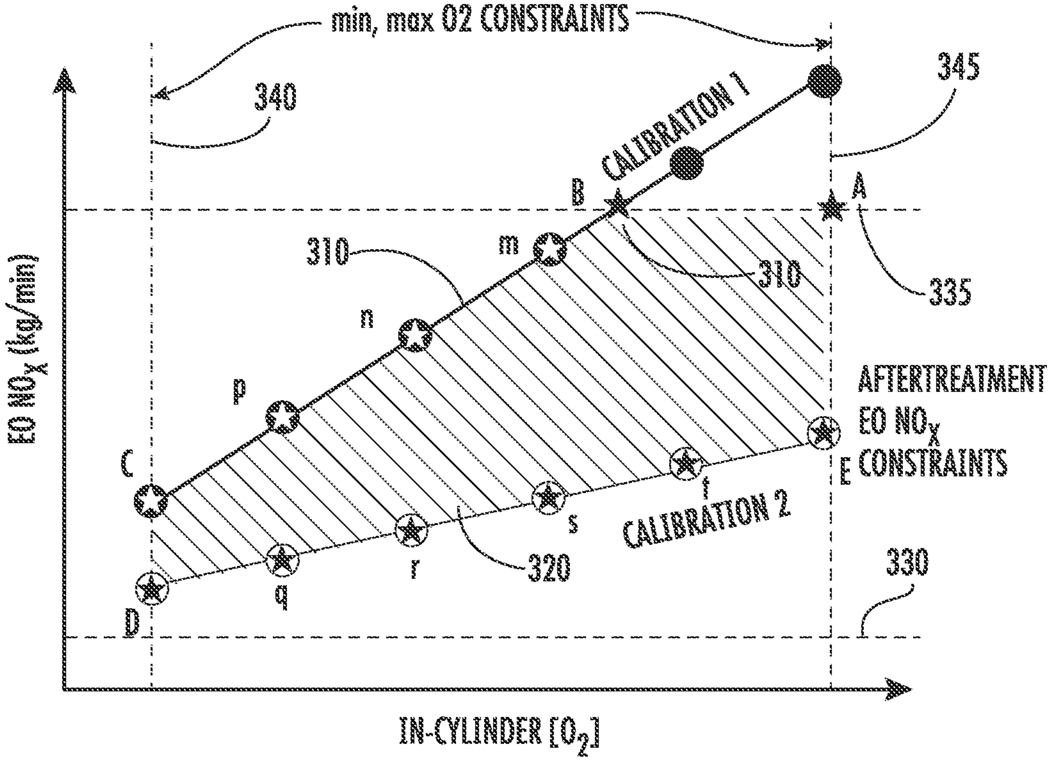
FIG. 3B is a graph showing the response model of FIG. 3A with constraints on the EONOx and in-cylinder oxygen being applied, according to an example embodiment.

Based on the current state, the aftertreatment system 130 (e.g., the aftertreatment controller 135) may impose emissions and/or temperature constraints. As an example for the illustration herein, the aftertreatment system 130 imposes a minimum allowable EONOx and a maximum allowable EONOx as constraints. The air handling system 120 may also impose constraints based on its current state, for example, the minimum achievable in-cylinder oxygen and the maximum achievable in-cylinder oxygen. The optimizer 210 may receive the constraints from the aftertreatment system 130 and the air handling system 120 via the communication interface 213. The response model circuit 214 may apply the constraints to the response models, as shown in FIG. 3B. Line 330 represents the minimum allowable EONOx constraint imposed by the aftertreatment system 130. Line 335 represents the maximum allowable EONOx constraints imposed by the aftertreatment system 130. Lines 340 and 345 show the minimum and maximum in-cylinder oxygen constraints imposed by the air handling system 120. With the constraints being applied, only pairs of (in-cylinder oxygen, EONOx) that fall into the polygon along the boundaries of AB, BC, CD, DE (i.e., the crosshatched area including the piecewise linear boundaries formed by calibrations 1 & 2 between points B-C and D-E respectively) of FIG. 3B are allowed or achievable. Similarly, the constraints can be applied to other piecewise linear response models.

The quasi-simplex optimization circuit 215 is structured to use a quasi-simplex process to determine optimal targets for manipulated variables (e.g., EONOx, in-cylinder oxygen) in order to optimize the performance variable (e.g., reductant fluid consumption, fuel consumption), while satisfying constraints imposed by subsystems of the engine system. As discussed above, the response models define the performance variable as a piecewise liner function of manipulated variables (in-cylinder oxygen, EONOx, engine speed, torque, etc.) to ensure bounded errors at all steady state points of the manipulated variables. In a classical simplex process, a linear programming problem is solved based on two rules. First, the solution lies at the intersection of the constraints or at the boundary conditions of the response function. Second, the local minimum is the same as the global minimum. The classical simplex process cannot be applied directly to the piecewise linear problems because the second rule is not satisfied. However, because the first rule is satisfied, the simplex process can be modified for the piecewise linear functions, which can be considered as a collection of several linear programming problems. The modified simplex process is referred to as quasi-simplex process herein.

In the quasi-simplex process, for every piecewise linear response model, a local minimum can be either at the intersections between the constraints or at the boundary conditions. A global minimum for the complete piecewise linear problem can be chosen from the local minima. For example, the global minimum can be the minimum of the local minima. Thus, with the knowledge of all constraint intersection points and boundary conditions in every linear region, the minimum of these values can be found.

Referring to FIG. 3B, every pair of (in-cylinder oxygen, EONOx) with boundaries AB, BC, CD, DE corresponds to a particular value of a performance variable such as fluid consumption. While the example uses fluid consumption as performance variable, optimization may be performed on other performance variables. The quasi-simplex optimization circuit 215 determines the minimum of the fluid consumption for all (in-cylinder, EONOx) pairs disposed along the boundaries, AB, BC, CD, and DE. Lines BC and DE are not necessarily straight. However, there is piecewise linearity between each segment, i.e., there are straight lines between all the starred points Bm, mn, np, pC, Dq, qr, rs, st, and tE. Thus, between points B to C and D to E, there is likely a collection of straight lines, where each star (A, B, C, D, E, m, n, p, q, r, s, t) is potential candidate for optimum. So the crosshatched polygon has vertices A, B, m, n, p, C, D, q, r, s, t, E. As discussed above, there may be multiple piecewise linear response models as shown in FIG. 3B. The quasi-simplex optimization circuit 215 determines the minimum fluid consumption for each of the piecewise linear response model. A global minimum for all the piecewise linear response models is determined to be the final optimal value. The (in-cylinder oxygen, EONOx) pair corresponding to the final optimal value of the fluid consumption is determined to be the optimal targets output to subsystems via the communication interface 213. The quasi-simplex optimization circuit 215 may also determine on which calibration line the optimal target pair (in-cylinder oxygen, EONOx) is on and command the combustion to follow that calibration. The optimal target may be in between the calibrations as well. It should be understood that the fluid consumption is given herein as an example for description and not for limitation. Other performance variables may be optimized and other constraints can be handled as far as they can be modeled by piecewise linear response models.

Figure 4A:
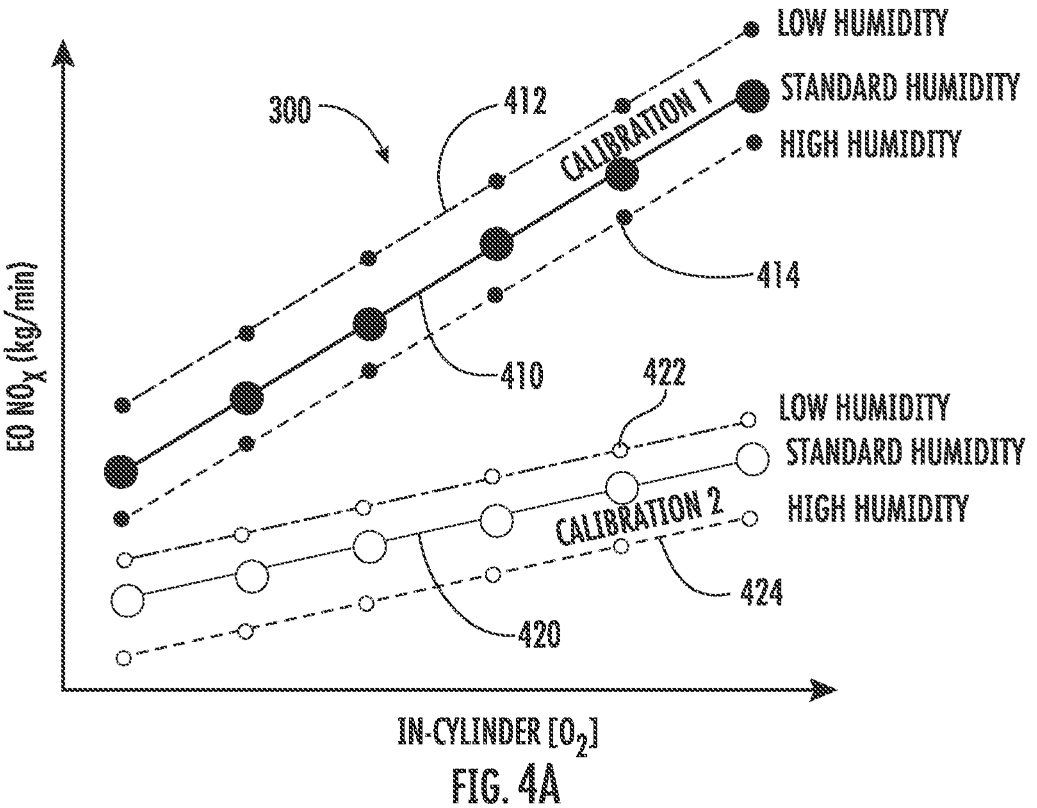
FIG. 4A is a graph showing shift of the response model of FIG. 3A with an ambient humidity, according to an example embodiment.

In some embodiments, the optimizer 210 includes a humidity compensation circuit 216 structured to compensate the response models with an ambient humidity. The response models may vary under ambient conditions. The accuracy of the real time static optimal targets can be improved with the response models being accurate. The ambient humidity conditions may have a significant impact on the production of NOx, as shown in FIG. 4A. The standard humidity lines 410 and 420 in FIG. 4A represent the response model for EONOx and in-cylinder oxygen under a first and second calibrations, for a standard humidity. Line 412 represents the shift of the first calibration line 410 under an ambient humidity lower than the standard humidity. Line 414 represents the shift of the first calibration line 410 under an ambient humidity higher than the standard humidity. Line 422 represents the shift of the second calibration line 420 under an ambient humidity lower than the standard humidity. Line 424 represents the shift of the second calibration line 420 under an ambient humidity higher than the standard humidity.

As shown by FIG. 4A, engine calibration may have been done at standard ambient conditions (i.e. humidity), and thus there may be a mismatch when ambient conditions deviate from standard (e.g. change in humidity). In some embodiments, the humidity compensation circuit 216 estimates the ambient humidity, and use the estimated ambient humidity to compensate the response models. In some embodiments, a humidity sensor may be used in place of or in addition to a humidity estimator. In further embodiments, the humidity compensation circuit 216 uses a recursive least square method to estimate the ambient humidity based on EONOx monitored by an EONOx sensor. The actual NOx concentration ($NOx_{act}$) can be related to the reference NOx concentration as follows:

$$NOx_{act}=K_{comp}*NOx_{ref} \quad (1),$$

wherein $K_{comp}$ is a compensation factor. Equation (1) can be transformed to:

$$NOx_{act}=(SH)a+b \quad (2),$$

wherein SH is the specific humidity, and:

$$\alpha=\beta \quad (3),$$

$$b=\alpha(T_{amb}-T_{Ref})-\beta(SH_{ref})+\gamma \quad (4).$$

In the above equations, α, β, and γ are constants, $T_{amb}$ is an ambient temperature, and $T_{Ref}$ is a reference temperature. The actual data may have noise and each observation can be written as (note that each observation corresponds to a different speed/load/in-cylinder oxygen point):

$$(NOx_{act})_i=(SH)a_i+b_i+\varepsilon_i \quad (5),$$

wherein i represents the i-th observation. Thus, the goal is to estimate the specific humidity SH given different observations of a, b, and $NOx_{act}$, that is, $$\underset{SH}{\operatorname{argmin}}((NOx_{act})_i-(SH)a_i+b_i).$$

In some embodiments, recursive least square estimation technique can be applied to solve this problem. The humidity can be recursively updated according to the following equation:

$$\widehat{SH}_i=\widehat{SH}_{i-1}-K_k(a_k\widehat{SH}_{i-1}-((NOx_{act})_i+b_i)) \quad (6),$$

wherein $K_k$ is the Kalman filter gain.

When the ambient humidity $\widehat{SH}_i$ is sensed or determined according to equation (6), the compensation factor $K_{comp}$ may be calculated according to the following equation and be applied to shift (i.e., compensate) the response models.

$$K_{comp}=\alpha(T_{amb}-T_{ref})+\beta(SH-SH_{ref})+\gamma \quad (7).$$

When the ambient temperature $T_{amb}$ is expressed as degrees Celsius (° C.) and the specific humidity SH expressed in grams of water per kilogram of air, equation (7) can be turned to the Krause equation:

$$K_{comp}=0.00446(T_{amb}-25)-0.018708(SH-10.71)+1 \quad (8).$$

In the above equation, the specific humidity can be determined according to equation (6), and ambient temperature $T_{amb}$ can be measured by, for example, a thermometer. The compensation factor $K_{comp}$ calculated according to equation (7 or 8) can be applied to adjust the response models for humidity, thus improving reference generation and reducing feedback control effort:

$$NOx_{ref,new}=K_{comp}*NOx_{ref} \quad (9).$$

Figure 4B:
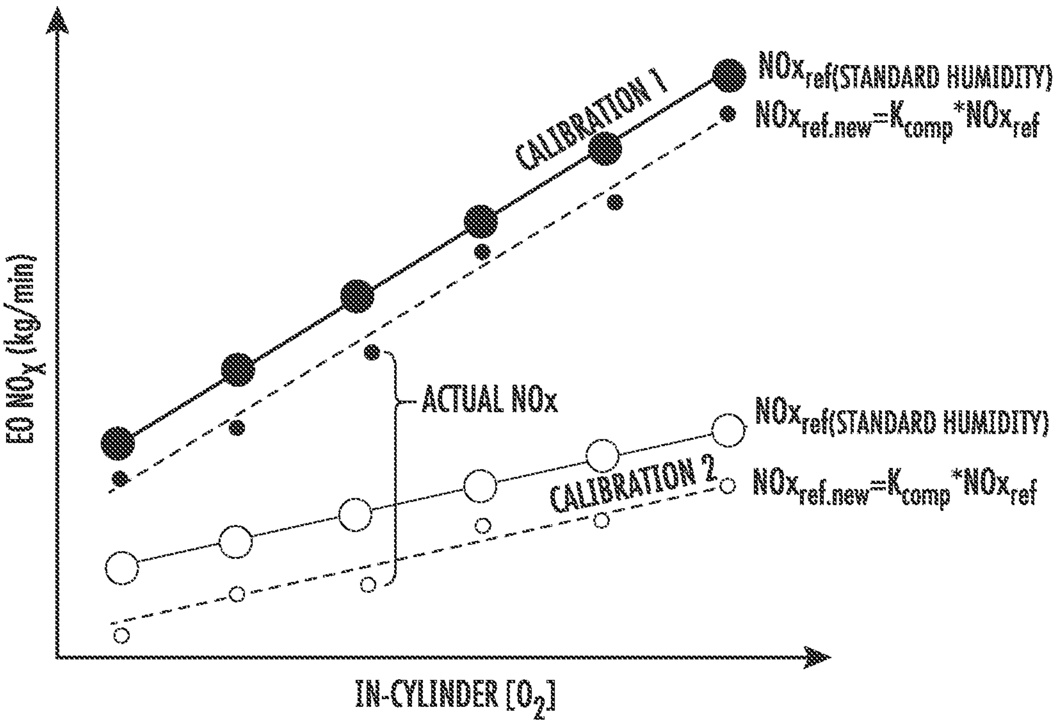
FIG. 4B is a graph showing the response model of FIG. 3A being compensated with a humidity compensation factor, according to an example embodiment.

The calculated $NOx_{ref,new}$ is show in FIG. 4B comparing to the $NOx_{ref}$.

Figure 5:
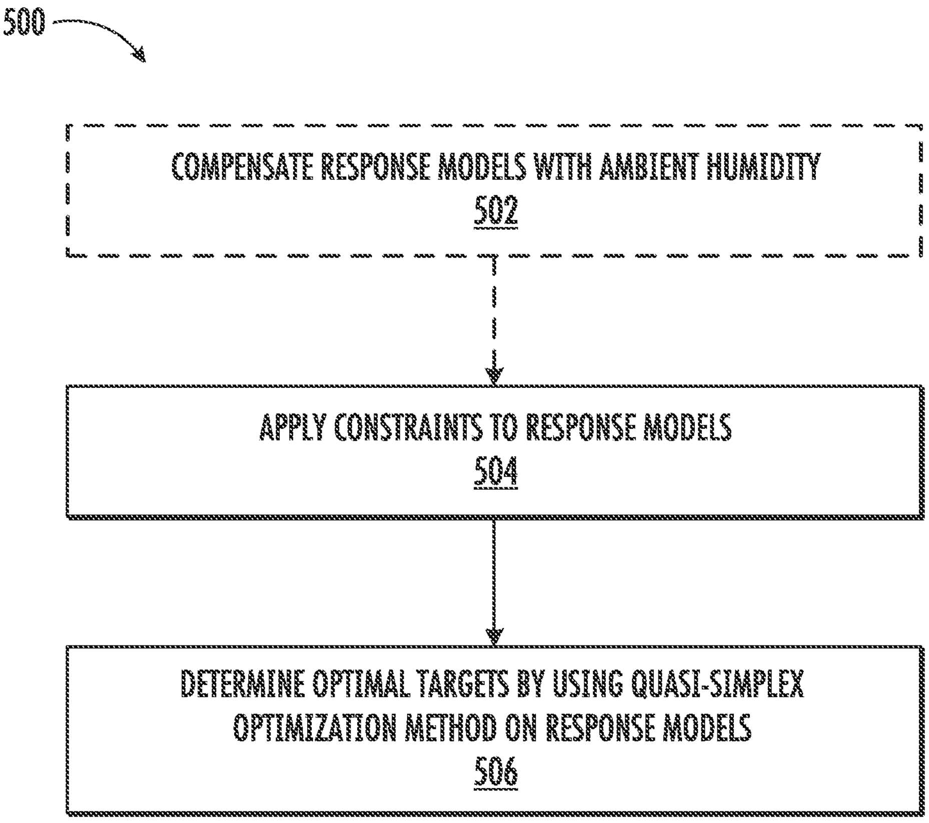
FIG. 5 is a flow diagram of a method for optimizing a performance variable for an engine system, according to an example embodiment.

Referring now to FIG. 5, a flow diagram of a method 500 for optimizing a performance variable for an engine system is shown, according to an example embodiment. The method 500 may be implemented with the optimizer 210 and in the engine system 100. The method 500 can be performed on a real-time basis using the Krauss formulation discussed above, or a different humidity compensation relationship.

At an optional operation 502, response models of manipulated variables and other engine responses are compensated with a current ambient humidity. The manipulated variables may include, for example, EONOx and in-cylinder oxygen. There may be multiple response models, each of which is a straight-line section (i.e. piecewise linear) of function for the manipulated variables. Speed and load are invariant for a given response model. The response models may be generated for various engine calibrations. Because the calibrations may have been done at standard ambient conditions (e.g., humidity), the response models may need to be adjusted when ambient conditions deviate from standard (e.g. change in humidity). In some embodiments, a humidity sensor may be used to detect ambient humidity changes. In some embodiments, a least square method is used to estimate the ambient humidity based on EONOx monitored by an EONOx sensor or estimate according to, for example, equation (6) as discussed above. Then the estimated ambient humidity is used to calculate a compensation factor according to equations (7) or (8). The compensation factor may be used to shift the response models according to equation (9). Because EONOx monitored by an EONOx sensor or estimator is used as a feedback to estimate the ambient humidity, no additional humidity sensor is needed. However a humidity sensor may be used instead of or in addition to the humidity estimator to validate its results.

At operation 504, constraints are applied to response models. Subsystems of the engine system may impose various constrains on the engine operation. For example, the aftertreatment system 130 may impose emissions and/or temperature constraints based on its current state. The constraints may include a minimum allowable EONOx and a maximum allowable EONOx. The air handling system 120 may also impose constraints based on its current state, for example, the minimum achievable in-cylinder oxygen and the maximum achievable in-cylinder oxygen. The constraints may be applied to the response models, as shown in FIG. 3B. With the constraints being applied, only pairs of (in-cylinder oxygen, EONOx) that fall into the crosshatched area (including the piecewise linear boundaries formed by calibrations 1 & 2 between points B-C and D-E respectively) of FIG. 3B are allowed or achievable. The crosshatched area covers along the boundaries, AB, BC, CD, and DE. Lines BC and DE are not necessarily straight. However, there is piecewise linearity between each segment, i.e., there are straight lines between all the starred points Bm, mn, np, pC, Dq, qr, rs, st, and tE. Thus, between points B to C and D to E, there is likely a collection of straight lines, where each star (A, B, C, D, E, m, n, p, q, r, s, t) is potential candidate for optimum. So the area is a polygon with vertices A, B, m, n, p, C, D, q, r, s, t, E.

At operation 506, an optimal target for each of the manipulated variables is determined by using a quasi-simplex optimization process on the response models. The optimal targets of the manipulated variables correspond to an optimal value of a performance variable (e.g., fluid/fuel consumption). In the quasi-simplex process, for every piecewise linear response model, a local minimum can be either at the intersections between the constraints or at the boundary conditions. Take FIG. 3B as an example. Every pair of (in-cylinder oxygen, EONOx) in the crosshatched area with boundaries AB, BC, CD, DE corresponds to a particular value of a performance variable such as fluid consumption. While the example uses fluid consumption as performance variable, optimization may be performed on other performance variables. Lines BC and DE are not necessarily straight. However, there is piecewise linearity between each segment, i.e., there are straight lines between all the starred points Bm, mn, np, pC, Dq, qr, rs, st, and tE. Thus, between points B to C and D to E, there is likely a collection of straight lines, where each star (A, B, C, D, E, m, n, p, q, r, s, t) is potential candidate for optimum. As discussed above, there may be multiple piecewise linear response models as shown in FIG. 3B. The minimum fluid consumption is determined for each of the piecewise linear response model. A global minimum for all the piecewise linear response models is determined to be the final optimal value. The (in-cylinder oxygen, EONOx) pair corresponding to the final optimal value of the fluid consumption is determined to be the optimal targets. It is also determined on which calibration line the optimal target pair (in-cylinder oxygen, EONOx) is on and the combustion is commanded to follow that calibration. The optimal targets and the optimal combustion may be used to control the engine operation. For example, a first reference may be generated for the fuel system using the optimal target for the EONOx. A second reference may be generated for the air handling using the optimal target for the in-cylinder oxygen.

It should be understood that no claim element herein is to be construed under the provisions of 35 U.S.C. § 112(f), unless the element is expressly recited using the phrase "means for." The schematic flow chart diagrams and method schematic diagrams described above are generally set forth as logical flow chart diagrams. As such, the depicted order and labeled steps are indicative of representative embodiments. Other steps, orderings and methods may be conceived that are equivalent in function, logic, or effect to one or more steps, or portions thereof, of the methods illustrated in the schematic diagrams. Further, reference throughout this specification to "one embodiment", "an embodiment", "an example embodiment", or similar language means that a particular feature, structure, or characteristic described in connection with the embodiment is included in at least one embodiment of the present invention. Thus, appearances of the phrases "in one embodiment", "in an embodiment", "in an example embodiment", and similar language throughout this specification may, but do not necessarily, all refer to the same embodiment.

Additionally, the format and symbols employed are provided to explain the logical steps of the schematic diagrams and are understood not to limit the scope of the methods illustrated by the diagrams. Although various arrow types and line types may be employed in the schematic diagrams, they are understood not to limit the scope of the corresponding methods. Indeed, some arrows or other connectors may be used to indicate only the logical flow of a method. For instance, an arrow may indicate a waiting or monitoring period of unspecified duration between enumerated steps of a depicted method. Additionally, the order in which a particular method occurs may or may not strictly adhere to the order of the corresponding steps shown. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and program code.

Many of the functional units described in this specification have been labeled as circuits, in order to more particularly emphasize their implementation independence. For example, a circuit may be implemented as a hardware circuit comprising custom very-large-scale integration (VLSI) circuits or gate arrays, off-the-shelf semiconductors such as logic chips, transistors, or other discrete components. A circuit may also be implemented in programmable hardware devices such as field programmable gate arrays, programmable array logic, programmable logic devices or the like.

As mentioned above, circuits may also be implemented in machine-readable medium for execution by various types of processors, such as the optimizer 210 of FIG. 2. An identified circuit of executable code may, for instance, comprise one or more physical or logical blocks of computer instructions, which may, for instance, be organized as an object, procedure, or function. Nevertheless, the executables of an identified circuit need not be physically located together, but may comprise disparate instructions stored in different locations which, when joined logically together, comprise the circuit and achieve the stated purpose for the circuit. Indeed, a circuit of computer readable program code may be a single instruction, or many instructions, and may even be distributed over several different code segments, among different programs, and across several memory devices. Similarly, operational data may be identified and illustrated herein within circuits, and may be embodied in any suitable form and organized within any suitable type of data structure. The operational data may be collected as a single data set, or may be distributed over different locations including over different storage devices, and may exist, at least partially, merely as electronic signals on a system or network.

The computer readable medium (also referred to herein as machine-readable media or machine-readable content) may be a tangible computer readable storage medium storing the computer readable program code. The computer readable storage medium may be, for example, but not limited to, an electronic, magnetic, optical, electromagnetic, infrared, holographic, micromechanical, or semiconductor system, apparatus, or device, or any suitable combination of the foregoing. As alluded to above, examples of the computer readable storage medium may include but are not limited to a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), an optical storage device, a magnetic storage device, a holographic storage medium, a micromechanical storage device, or any suitable combination of the foregoing. In the context of this document, a computer readable storage medium may be any tangible medium that can contain, and/or store computer readable program code for use by and/or in connection with an instruction execution system, apparatus, or device.

Computer readable program code for carrying out operations for aspects of the present invention may be written in any combination of one or more programming languages, including an object oriented programming language such as Java, Smalltalk, C++ or the like and conventional procedural programming languages, such as the "C" programming language or similar programming languages.

The program code may also be stored in a computer readable medium that can direct a computer, other programmable data processing apparatus, or other devices to function in a particular manner, such that the instructions stored in the computer readable medium produce an article of manufacture including instructions which implement the function/act specified in the schematic flowchart diagrams and/or schematic block diagrams block or blocks.

Accordingly, the present disclosure may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

What is claimed is:

1. An apparatus for controlling a performance variable of an engine system, the apparatus comprising:

a response model circuit structured to apply a constraint to a response model that represents a relationship regarding a manipulated variable or a relationship between the performance variable and the manipulated variable; and an optimization circuit structured to determine a target for the manipulated variable via the response model such that the target of the manipulated variable satisfies the constraint of the response model, wherein the performance variable is indicative of performance of operation of the engine system, and the manipulated variable is capable of affecting the performance variable, wherein the performance variable includes a fluid consumption value and the manipulated variable includes an engine out nitrogen oxide (EONOx) value and an in-cylinder oxygen value of the engine system, and wherein operation of the engine system is adjusted based upon the target of the manipulated variable by controlling a fuel system and an air handling system of the engine system.

2. The apparatus of claim 1, wherein the constraint to the response model includes a constraint to the manipulated variable; and wherein the target of the manipulated variable corresponds to an optimal value of the performance variable.

3. The apparatus of claim 2, wherein the fluid consumption value is a reductant consumption value, and wherein the optimal value of the performance variable is a minimum value of the reductant consumption value of the response model.

4. The apparatus of claim 3, wherein the target for the EONOx is used to generate a first reference for the fuel system of the engine system, and the target for the in-cylinder oxygen value is used to generate a second reference for the air handling system of the engine system.

5. The apparatus of claim 4, wherein the fuel system is controlled using the first reference, and the air handling system is controlled using the second reference.

6. The apparatus of claim 1, further comprising a communication interface structured to:

receive data indicative of a current operation state of the engine system from a subsystem of the engine system; and transmit the target to the subsystem.

7. The apparatus of claim 1, further comprising a humidity compensation circuit structured to compensate the response model with a current ambient humidity.

8. The apparatus of claim 1, further comprising a humidity compensation circuit structured to:

update a current ambient humidity;

determine a compensation factor for the current ambient humidity; and shift the response model using the compensation factor.

9. A method for controlling a performance variable of an engine system, the method comprising:

applying a constraint to a response model that represents a relationship with a manipulated variable or a relationship between the performance variable and the manipulated variable;

determining a target for the manipulated variable via the response model, wherein the performance variable is indicative of performance of operation of the engine system and the manipulated variable is capable of affecting the performance variable; and adjusting the operation of the engine system based on the target of the manipulated variable by controlling a fuel system and an air handling system.

10. The method of claim 9, wherein the constraint to the response model includes a constraint to the manipulated variable; and wherein the target of the manipulated variable correspond to an optimal value of the performance variable.

11. The method of claim 9, wherein the performance variable includes a fluid consumption value, and wherein an optimal value of the performance variable is a minimum value of the fluid consumption value and the manipulated variable includes an engine out nitrogen oxide (EONOx) value of the engine system.

12. The method of claim 11, wherein operation of the engine system is adjusted based on the target of the manipulated variable by generating one or more references for the operation of the engine system that controls at least one of the fuel system or the air handling system.

13. The method of claim 12, wherein the one or more references include a first reference for the fuel system and a second reference for the air handling system, the method further comprising:

generating the first reference for the fuel system using the target for the EONOx value of the engine system, and generating the second reference for the air handling system using a target associated with the air handling system.

14. The method of claim 13, further comprising:

controlling the fuel system using the first reference; and controlling the air handling system using the second reference.

15. The method of claim 9, further comprising:

updating a current ambient humidity;

determining a compensation factor for the current ambient humidity; and modifying the response model using the compensation factor.

16. A system for controlling a performance variable of an engine system, the system comprising:

at least one processing circuit structured to:

apply a constraint to a response model that represents a relationship regarding a manipulated variable or a relationship between the performance variable and the manipulated variable;

determine a target for the manipulated variable via the response model such that the target of the manipulated variable satisfies the constraint of the response model, wherein the performance variable is indicative of performance of operation of the engine system and the manipulated variable is capable of affecting the performance variable; and adjust the operation of the engine system based upon the target of the manipulated variable by controlling a fuel system and an air handling system.

17. The system of claim 16, wherein the constraint to the response model includes a constraint to the manipulated variable; and wherein the target of the manipulated variable correspond to an optimal value of the performance variable.

18. The system of claim 17, wherein the performance variable includes a fluid consumption value comprising a reductant consumption value, and wherein the optimal value of the performance variable is a minimum value of the reductant consumption value.

19. The system of claim 16, wherein the manipulated variable includes an engine out nitrogen oxide (EONOx) value, wherein operation of the engine system is adjusted based on the target of the manipulated variable by generating one or more references for the operation of the engine system that control at least one of the fuel system or the air handling system, wherein the one or more references include a first reference for the fuel system and a second reference for the air handling system, and wherein the at least one processing circuit is further structured to:

generate the first reference for the fuel system using the target for the EONOx value; and generate the second reference for the air handling system using a target for an in-cylinder oxygen value.

20. The system of claim 16, wherein the at least one processing circuit is further structured to:

update a current ambient humidity without using a humidity sensor to compensate the response model;

determine a compensation factor for the current ambient humidity; and adjust the response model using the compensation factor.

* * * * *